US012742413B2

(12) United States Patent
Breault et al.

(10) Patent No.: US 12,742,413 B2
(45) Date of Patent: Sep. 22, 2026

(54) BUFFER AIR ASSEMBLY FOR AN AIRCRAFT ENGINE

(71) Applicant: Raytheon Technologies Corporation, Farmington, CT (US)

(72) Inventors: Andrew E. Breault, Bolton, CT (US); William K. Ackermann, East Hartford, CT (US)

(73) Assignee: RTX Corporation, Farmington, CT (US)

( * ) Notice: Subject to any disclaimer, the term of this patent is extended or adjusted under 35 U.S.C. 154(b) by 43 days.

(21) Appl. No.: 18/224,921

(22) Filed: Jul. 21, 2023

(65) Prior Publication Data

US 2025/0027445 A1 Jan. 23, 2025

(51) Int. Cl.
*F02C 6/08* (2006.01)
*F02C 9/18* (2006.01)

(52) U.S. Cl.
CPC .................. *F02C 6/08* (2013.01); *F02C 9/18* (2013.01); *F05D 2260/606* (2013.01)

(58) Field of Classification Search
CPC ........ F01D 25/18; F01D 25/183; F01D 25/22; F02C 6/08; F02C 9/18; F02C 7/06; F02C 7/26; F02C 7/27
See application file for complete search history.

(56) References Cited

U.S. PATENT DOCUMENTS 3,487,993 A * 1/1970 Rannenberg .......... F04D 27/023 60/785
6,345,954 B1 2/2002 Al-Himyary
9,003,766 B2 * 4/2015 Ferra ..................... F01D 25/183 60/785
9,382,844 B2 * 7/2016 Muldoon .............. F01D 25/183
9,890,707 B2 * 2/2018 Kraft ....................... F01K 23/10
10,415,468 B2 9/2019 Ackermann
10,724,431 B2 7/2020 Munsell
10,731,563 B2 8/2020 Munsell
2009/0196736 A1 * 8/2009 Sengar ...................... F02C 6/08 415/115
2013/0177406 A1 * 7/2013 Heaton ................. F01D 25/162 415/176
2013/0192239 A1 * 8/2013 Glahn ..................... F01D 25/18 60/785
2016/0369705 A1 * 12/2016 Mackin ..................... F02C 6/08

(Continued)

OTHER PUBLICATIONS

EP Search Report for EP Patent Application No. 24189771.9 dated Dec. 17, 2024.

*Primary Examiner* — Thuyhang N Nguyen
(74) *Attorney, Agent, or Firm* — Getz Balich LLC

(57) ABSTRACT

A buffer air assembly for an aircraft engine includes a first pressurized air header, at least one first bearing compartment, a first bleed air source, and at least one electric buffer compressor. The at least one first bearing compartment is connected in fluid communication with the first pressurized air header. The first bleed air source is connected in fluid communication with the first pressurized air header by a first bleed check valve. The first bleed air source is configured to direct first pressurized bleed air to the first pressurized air header through the first bleed check valve. The at least one electric buffer compressor is connected in fluid communication with the first pressurized air header by a first buffer compressor check valve.

10 Claims, 4 Drawing Sheets

(56) References Cited

U.S. PATENT DOCUMENTS

| | | | | |
|---|---|---|---|---|
| 2017/0268423 | A1 | 9/2017 | Schwarz | |
| 2017/0284305 | A1* | 10/2017 | Suciu | F02C 3/04 |
| 2017/0363098 | A1 | 12/2017 | Taylor | |
| 2019/0145420 | A1* | 5/2019 | Schwarz | F01D 17/105 415/145 |
| 2019/0309683 | A1* | 10/2019 | Mackin | F02C 7/047 |
| 2019/0353103 | A1* | 11/2019 | Roberge | F02C 7/32 |
| 2020/0248627 | A1 | 8/2020 | Amari | |
| 2021/0396177 | A1* | 12/2021 | Ackermann | F01D 25/16 |
| 2024/0003293 | A1* | 1/2024 | Takami | B64D 13/02 |

* cited by examiner

BUFFER AIR ASSEMBLY FOR AN AIRCRAFT ENGINE

BACKGROUND

1. Technical Field

This disclosure relates generally to a buffer air assembly for an aircraft engine and, more particularly, to a buffer air assembly including an electric buffer compressor.

2. Background Information

Rotational equipment, such as a gas turbine engine for an aircraft propulsion system, may include a buffer air assembly for providing buffer air to one or more bearing compartments of the rotational equipment. Various types and configurations of buffer air assemblies are known in the art. While these known buffer air assemblies have various advantages, there is still room in the art for improvement. There is a need in the art, therefore, for an improved buffer air assembly for rotational equipment.

SUMMARY

It should be understood that any or all of the features or embodiments described herein can be used or combined in any combination with each and every other feature or embodiment described herein unless expressly noted otherwise.

According to an aspect of the present disclosure, a buffer air assembly for an aircraft engine includes a first pressurized air header, at least one first bearing compartment, a first bleed air source, and at least one electric buffer compressor. The at least one first bearing compartment is connected in fluid communication with the first pressurized air header. The first bleed air source is connected in fluid communication with the first pressurized air header by a first bleed check valve. The first bleed air source is configured to direct first pressurized bleed air to the first pressurized air header through the first bleed check valve. The at least one electric buffer compressor is connected in fluid communication with the first pressurized air header by a first buffer compressor check valve.

In any of the aspects or embodiments described above and herein, the buffer air assembly may further include a second pressurized air header, at least one second bearing compartment, and a second bleed air source. The at least one second bearing compartment may be connected in fluid communication with the second pressurized air header. The second bleed air source may be different than the first bleed air source. The second bleed air source may be connected in fluid communication with the second pressurized air header by a second bleed check valve. The second bleed air source may be configured to direct second pressurized bleed air to the second pressurized air header through the second bleed check valve. The at least one electric buffer compressor may be connected in fluid communication with the second pressurized air header by a second buffer compressor check valve.

In any of the aspects or embodiments described above and herein, the at least one electric buffer compressor may include a low-pressure electric buffer compressor and a high-pressure electric buffer compressor. The low-pressure electric buffer compressor may be connected in fluid communication with the first pressurized air header by the first buffer compressor check valve and the high-pressure electric buffer compressor may be connected in fluid communication with the second pressurized air header by the second buffer compressor check valve.

In any of the aspects or embodiments described above and herein, the first pressurized air header may be isolated from the second pressurized air header.

In any of the aspects or embodiments described above and herein, the at least one electric buffer compressor may include a single electric buffer compressor. The single electric buffer compressor may be configured to direct pressurized buffer air to both of the first pressurized air header and the second pressurized air header.

In any of the aspects or embodiments described above and herein, the single electric buffer compressor may include an air outlet. The air outlet may be connected in fluid communication with the first pressurized air header by the first buffer compressor check valve. The air outlet may be connected in fluid communication with the second pressurized air header by the second buffer compressor check valve.

In any of the aspects or embodiments described above and herein, the buffer air assembly may further include a second pressurized air header, at least one second bearing compartment, and a second bleed air source. The second pressurized air header may be connected in fluid communication with the first pressurized air header by a check valve. The check valve may be configured to direct pressurized air from the first pressurized air header to the second pressurized air header. The at least one second bearing compartment may be connected in fluid communication with the second pressurized air header. The second bleed air source may be different than the first bleed air source. The second bleed air source may be connected in fluid communication with the second pressurized air header by a second bleed check valve. The second bleed air source may be configured to direct second pressurized bleed air to the second pressurized air header through the second bleed check valve.

In any of the aspects or embodiments described above and herein, the at least one electric buffer compressor may include a single electric buffer compressor. The single electric buffer compressor may include an air outlet and an air inlet. The air outlet may be connected in fluid communication with the first pressurized air header by the first buffer compressor check valve. The buffer air assembly may further include a second bleed air source. The second bleed air source may be different than the first bleed air source. The second bleed air source may be connected in fluid communication with the air inlet.

In any of the aspects or embodiments described above and herein, the at least one electric buffer compressor may include an air outlet. The buffer air assembly may further include a blow-off valve connected at the air outlet.

In any of the aspects or embodiments described above and herein, the buffer air assembly may further include a controller connected in signal communication with the at least one electric buffer compressor. The controller may include a processor in communication with a non-transitory memory storing instructions, which instructions when executed by the processor, may cause the processor to energize the electric buffer compressor to direct the pressurized buffering air to the first pressurized air header.

In any of the aspects or embodiments described above and herein, the instructions, when executed by the processor, may further cause the processor to measure a pressure of the first pressurized bleed air, identify the measured pressure is greater than or equal to a predetermined threshold pressure, and deenergize the at least one electric buffer compressor in response to the identification of the measured pressure greater than or equal to the predetermined threshold pressure.

In any of the aspects or embodiments described above and herein, the instructions, when executed by the processor, may further cause the processor to measure a pressure of the first pressurized bleed air, identify the measured pressure is less than or equal to a predetermined threshold pressure, and energize the electric buffer compressor to direct the pressurized buffering air to the first pressurized air header in response to identification of the measured pressure less than or equal to the predetermined threshold pressure.

According to another aspect of the present disclosure, an engine for an aircraft includes a low-pressure compressor, a high-pressure compressor, and a buffer air assembly. The buffer air assembly includes a low-pressure header, a high-pressure header, and at least one electric buffer compressor. The low-pressure header is connected to at least one low-pressure bearing compartment and the low-pressure compressor. The low-pressure header is configured to receive a low-pressure bleed air from the low-pressure compressor. The high-pressure header is connected to at least one high-pressure bearing compartment and the high-pressure compressor. The high-pressure header is configured to receive a high-pressure bleed air from the high-pressure compressor. The at least one electric buffer compressor configured to direct pressurized buffering air to the low-pressure header and the high-pressure header.

In any of the aspects or embodiments described above and herein, the engine may further include a controller connected in signal communication with the at least one electric buffer compressor. The controller may include a processor in communication with a non-transitory memory storing instructions, which instructions when executed by the processor, may cause the processor to control an engine startup sequence for the engine. The engine startup sequence may include energizing the at least one electric buffer compressor to direct the pressurized buffering air to the low-pressure header and the high-pressure header.

In any of the aspects or embodiments described above and herein, the engine may further include a first rotational assembly, a second rotational assembly, at least one high-pressure bearing assembly, and at least one low-pressure bearing assembly. The first rotational assembly may include the high-pressure compressor. The second rotational assembly may include the low-pressure compressor. The at least one high-pressure bearing assembly may rotatably support the first rotational assembly. The at least one high-pressure bearing assembly may be connected to the high-pressure header. The at least one low-pressure bearing assembly may rotatably support the second rotational assembly. The at least one low-pressure bearing assembly may be connected to the low-pressure header.

In any of the aspects or embodiments described above and herein, the at least one electric buffer compressor may include a low-pressure electric buffer compressor and a high-pressure electric buffer compressor. The low-pressure electric buffer compressor may be connected in fluid communication with the low-pressure header and the high-pressure electric buffer compressor may be connected in fluid communication with the high-pressure header.

In any of the aspects or embodiments described above and herein, the at least one electric buffer compressor may include a single electric buffer compressor. The single electric buffer compressor may be configured to direct the pressurized buffer air to both of the low-pressure header and the high-pressure header.

According to another aspect of the present disclosure, a buffer air assembly for an aircraft engine includes a first pressurized air header, at least one first bearing compartment, a first bleed air source, a second pressurized air header, at least one second bearing compartment, a second bleed air source, and at least one electric buffer compressor. The at least one first bearing compartment is connected in fluid communication with the first pressurized air header. The first bleed air source connected in fluid communication with the first pressurized air header. The first bleed air source is configured to direct first pressurized bleed air to the first pressurized air header. The at least one second bearing compartment is connected in fluid communication with the second pressurized air header. The second bleed air source is different than the first bleed air source. The second bleed air source is connected in fluid communication with the second pressurized air header. The second bleed air source is configured to direct first pressurized bleed air to the first pressurized air header. The at least one electric buffer compressor is configured to direct pressurized buffer air to the first pressurized air header and the second pressurized air header.

In any of the aspects or embodiments described above and herein, the at least one electric buffer compressor may include a low-pressure electric buffer compressor and a high-pressure electric buffer compressor. The low-pressure electric buffer compressor may be connected in fluid communication with the first pressurized air header and the high-pressure electric buffer compressor may be connected in fluid communication with the second pressurized air header.

In any of the aspects or embodiments described above and herein, the at least one electric buffer compressor may include a single electric buffer compressor. The single electric buffer compressor may be configured to direct the pressurized buffer air to both of the first pressurized air header and the second pressurized air header.

The present disclosure, and all its aspects, embodiments and advantages associated therewith will become more readily apparent in view of the detailed description provided below, including the accompanying drawings.

DETAILED DESCRIPTION

Figure 1:
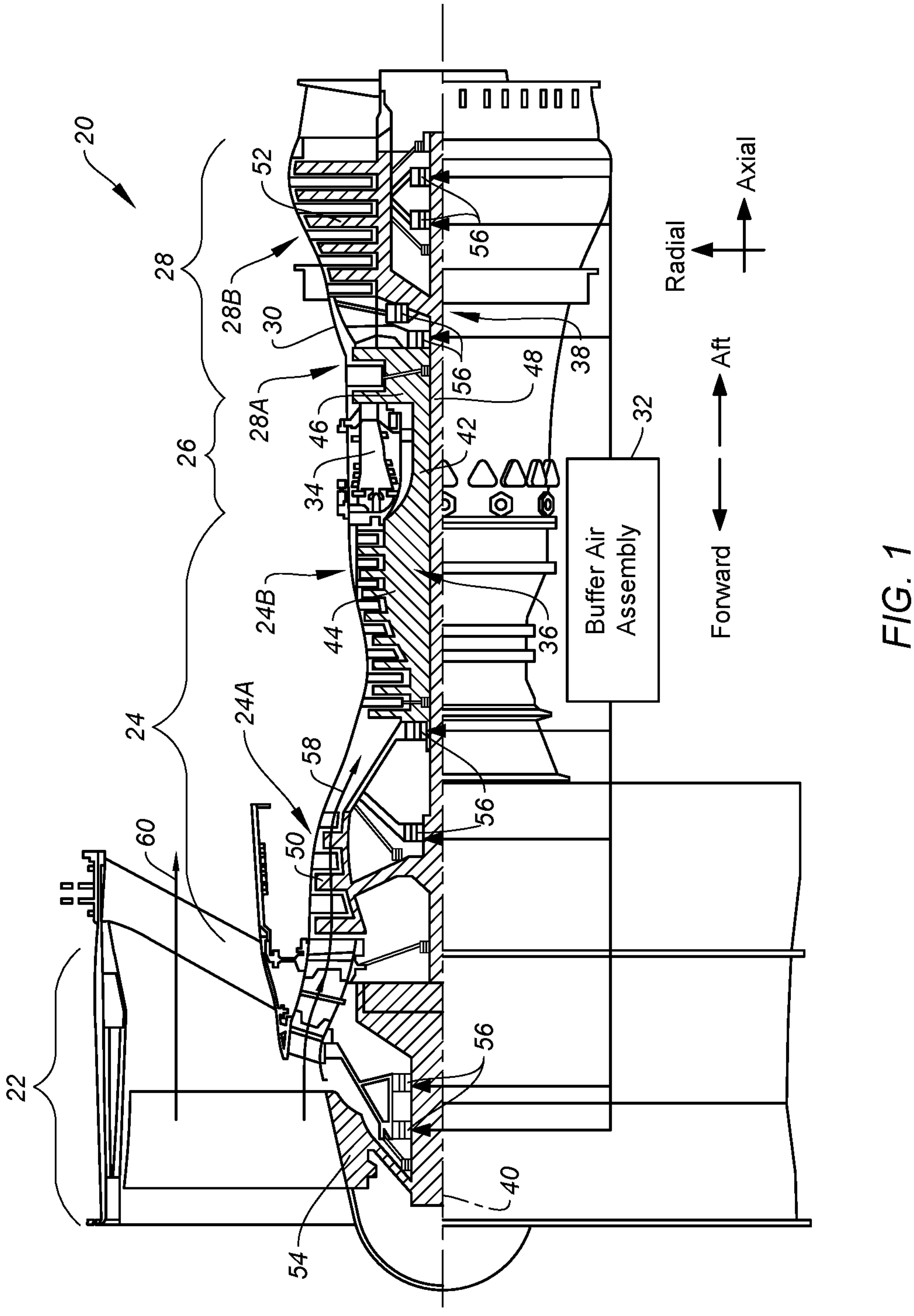
FIG. 1 schematically illustrates a cutaway view of an engine for an aircraft propulsion system, in accordance with one or more embodiments of the present disclosure.

FIG. 1 schematically illustrates an engine 20. The engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, the present disclosure may also be equally applicable to other types of engines including, but not limited to, rotary engines (e.g., Wankel engines), piston engines, or the like.

The engine 20 of FIG. 1 includes a fan section 22, a compressor section 24, a combustor section 26, a turbine section 28, and engine static structure 30, and a buffer air assembly 32. The compressor section 24 of FIG. 1 includes a low-pressure compressor (LPC) 24A and a high-pressure compressor (HPC) 24B. The combustor section 26 includes a combustor 34 (e.g., an annular combustor). The turbine section 28 includes a high-pressure turbine (HPT) 28A and a low-pressure turbine (LPT) 28B.

Components of the fan section 22, the compressor section 24, the combustor section 26, and the turbine section 28 form a first rotational assembly 36 (e.g., a high-pressure spool) and a second rotational assembly 38 (e.g., a low-pressure spool) of the engine 20. The first rotational assembly 36 and the second rotational assembly 38 are mounted for rotation about an axial centerline 40 (e.g., a rotational axis) of the engine 20 relative to the engine static structure 30 of the engine 20.

The first rotational assembly 36 includes a first shaft 42, a bladed first compressor rotor 44 for the high-pressure compressor 24B, and a bladed first turbine rotor 46 for the high-pressure turbine 28A. The first shaft 42 interconnects the bladed first compressor rotor 44 and the bladed first turbine rotor 46.

The second rotational assembly 38 includes a second shaft 48, a bladed second compressor rotor 50 for the low-pressure compressor 24A, and a bladed second turbine rotor 52 for the low-pressure turbine 28B. The second shaft 48 interconnects the bladed second compressor rotor 50 and the bladed second turbine rotor 52. The second shaft 48 may additionally be directly or indirectly coupled to a bladed fan rotor 54 for the fan section 22. For example, the second shaft 48 may be coupled to the bladed fan rotor 54 (e.g., an input shaft of the bladed fan rotor 54) by a reduction gear assembly configured to drive the bladed fan rotor 54 at a reduced rotational speed relative to the second shaft 48.

The engine static structure 30 may include one or more engine cases, cowlings, bearing assemblies, and/or other non-rotating structures configured to house and/or support components of the engine 20 sections 22, 24, 26, 28. The engine static structure 30 of FIG. 1 includes a plurality of bearing assemblies 56 for rotationally supporting components of the first rotational assembly 36 and/or the second rotational assembly 38. It should be understood that bearing assemblies, such as the bearing assemblies 56, may be provided at various additional or alternative locations of the engine 20.

In operation of the engine 20 of FIG. 1, ambient air is directed through the fan section 22 and into a core flow path 58 and a bypass flow path 60 by rotation of the bladed fan rotor 54. Airflow along the core flow path 58 is compressed by the low-pressure compressor 24A and the high-pressure compressor 24B, mixed and burned with fuel in the combustor 34, and then directed through the high-pressure turbine 28A and the low-pressure turbine 28B. The bladed first turbine rotor 46 and the bladed second turbine rotor 52 rotationally drive the first rotational assembly 36 and the second rotational assembly 38, respectively, in response to the combustion gas flow through the high-pressure turbine 28A and the low-pressure turbine 28B. The first shaft 42 and the second shaft 48 are concentric and rotate about the axial centerline 40 supported by the bearing assemblies 56.

During operation of an engine, such as the engine 20, pressurized bleed air from a compressor section (e.g., an LPC and/or an HPC) of the engine may be directed to a bearing compartment for one or more bearing assemblies. This pressurized bleed air may be referred to as "buffer air." The buffer air may be directed to the bearing compartment to facilitate the operation of bearing compartment seals, thereby providing sealing for the bearing compartment. For example, the buffer air may be directed to the bearing compartment to ensure a sufficiently positive differential pressure across the bearing compartment seals to prevent oil leakage ("weepage") from the bearing compartment. During some operating conditions of an engine, bleed air flow from the compressor section may be insufficient to provide suitable sealing of the bearing compartment. For example, during engine startup and sub-idle operating conditions, bleed air flow from the compressor section may be relatively low and may not provide suitable buffer air for sealing of the bearing compartment. In at least some conventional buffer air systems, an active switching valve (sometimes referred to as a "buffer switching valve") may be used to selectively direct pressurized air from different pressurized air sources (e.g., low-pressure sources and high-pressure sources) to different pressurized air loads (e.g., low-pressure bearing compartments and high-pressure bearing compartments) depending, for example, on the availability of pressurized air. For example, the active switching valve may selectively direct pressurized air from a first pressurized air source or a second pressurized air source to one or more pressurized air loads. For further example, the active switching valve may selectively cross-connect or isolate two different pressurized air headers (e.g., a low-pressure header and a high-pressure header). However, these active switching valves may be prone to failure during engine operations.

Figure 2:
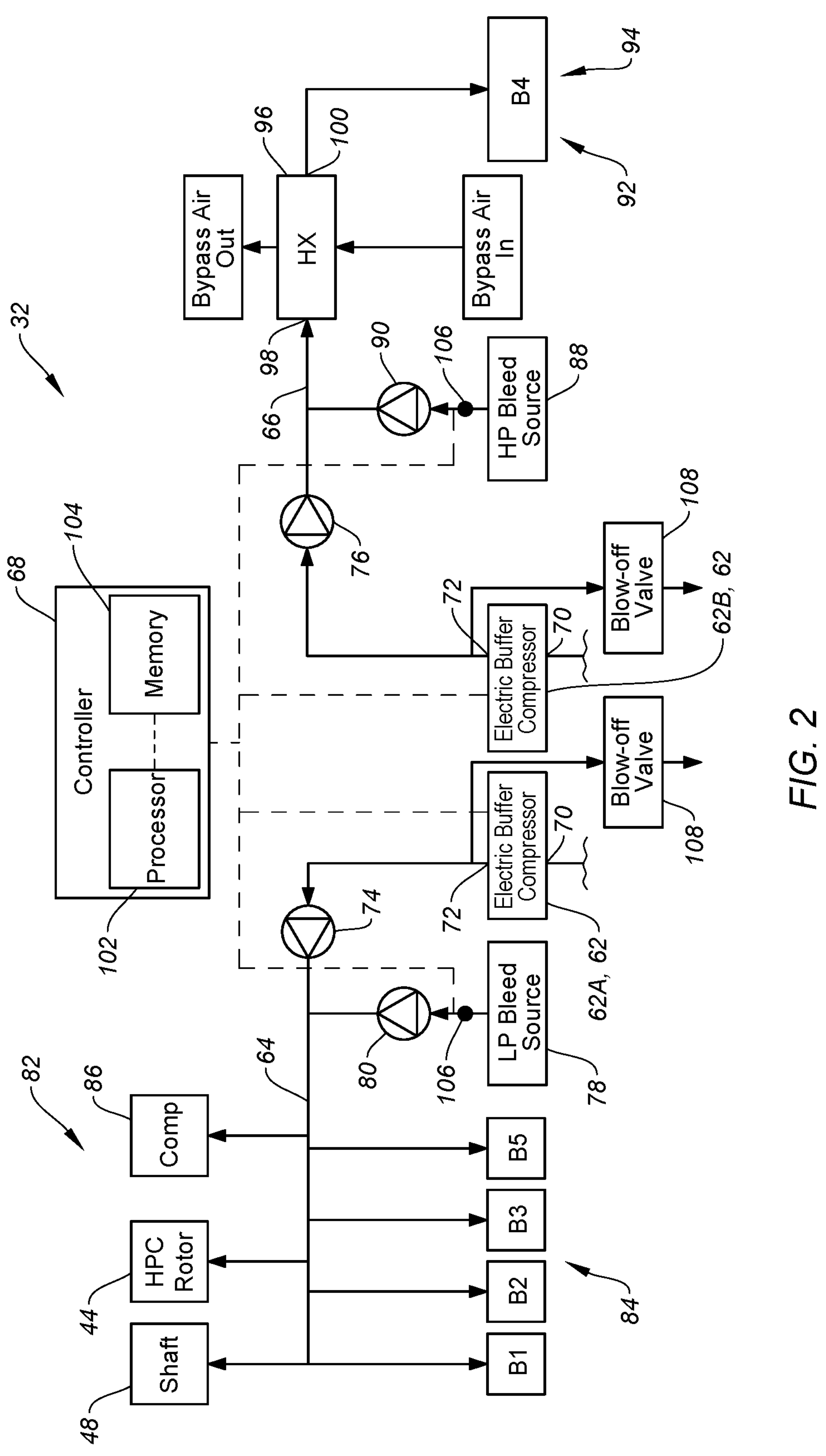
FIG. 2 schematically illustrates a buffer air assembly for an engine, in accordance with one or more embodiments of the present disclosure.

FIG. 2 schematically illustrates the buffer air assembly 32. The buffer air assembly 32 includes at least one electric buffer compressor 62, a low-pressure header (LP header) 64, and a high-pressure header (HP header) 66. The buffer air assembly may further include a controller 68.

The electric buffer compressor 62 includes an air inlet 70 and an air outlet 72. The electric buffer compressor 62 includes an electric motor which drives the electric buffer compressor 62 (e.g., a centrifugal compressor rotor) to compress air (e.g., from the air inlet 70) and direct the resultant pressurized air to the air outlet 72. The electric buffer compressor 62 (e.g., the electric motor) may be electrically connected to an electric distribution system or other electric power source of the engine 20 and/or an aircraft on which the engine 20 is installed. For example, the electric buffer compressor 62 (e.g., the electric motor) may be electrically connected with a battery, a generator, an auxiliary power unit (APU), or the like to receive power for operation of the electric buffer compressor 62. The present disclosure, however, is not limited to the foregoing exemplary electrical power supply configurations. The air inlet 70 may be configured to draw ambient air from any ambient air location or other air source such as, but not limited to, the bypass flow path 60, a compartment of the engine 20, an exterior of the engine 20, a compressor of the engine 20 (e.g., the low-pressure compressor 24A or the high-pressure compressor 24B), or the like.

The at least one electric buffer compressor 62 of FIG. 2 includes a low-pressure (LP) electric buffer compressor 62A and a high-pressure (HP) electric buffer compressor 62B. The LP electric buffer compressor 62A of FIG. 2 is connected in fluid communication with the LP header 64 by a check valve 74. The check valve 74 is configured to direct pressurized air from the LP electric buffer compressor 62A (e.g., the air outlet 72) to the LP header 64. The check valve 74 is configured to obstruct (e.g., completely or substantially completely block) air flow in a direction from the LP header 64 to the first electric buffer compressor 62A. The HP electric buffer compressor 62B of FIG. 2 is connected in fluid communication with the HP header 66 by a check valve 76. The check valve 76 is configured to direct pressurized air from the HP electric buffer compressor 62B (e.g., the air outlet 72) to the HP header 66. The check valve 76 is configured to obstruct (e.g., completely or substantially completely block) air flow in a direction from the HP header 66 to the second electric buffer compressor 62B.

The LP header 64 is connected in fluid communication with a low-pressure bleed air (LP bleed) source 78. The LP bleed source 78 of FIG. 2 is connected in fluid communication with the LP header 64 by a check valve 80. The check valve 80 is configured to direct pressurized air from the LP bleed source 78 to the LP header 64. The check valve 80 is configured to obstruct (e.g., completely or substantially completely block) air flow in a direction from the LP header 64 to the LP bleed source 78. The LP bleed source 78 may be, for example, an intermediate stage or discharge of the low-pressure compressor 24A (see FIG. 1).

The LP header 64 is connected in fluid communication with one or more low-pressure bleed air loads (LP loads) 82 downstream of the LP electric buffer compressor 62A and the LP bleed source 78. The LP loads 82 of FIG. 2 include one or more bearing compartments 84 (e.g., for the bearing assemblies 56; see FIG. 1). For example, the bearing compartments 84 of FIG. 2 include bearing compartments B1, B2, B3, B5. The present disclosure, however, is not limited to any particular number of the bearing compartments 84. The LP header 64 is configured to supply pressurized air to the bearing compartments 84 from the LP electric buffer compressor 62A or the LP bleed source 78 for air buffering and/or cooling. The LP loads 82 of FIG. 2 further include the bladed first compressor rotor 44 and the second shaft 48 (see also FIG. 1). The bladed first compressor rotor 44 and the second shaft 48 of FIG. 2 are configured to receive pressurized air from the LP header 64 for air cooling. The LP loads 82 may additionally include one or more other engine components 86 configured to receive pressurized air from the LP header 64 for thermal conditioning such as, but not limited to, stator vanes, rotor blades, clearance control devices, and the like. The present disclosure, however, is not limited to the foregoing exemplary LP loads 82 of FIG. 2.

The HP header 66 is connected in fluid communication with a high-pressure bleed air (HP bleed) source 88. The HP bleed source 88 of FIG. 2 is connected in fluid communication with the HP header 66 by a check valve 90. The check valve 90 is configured to direct pressurized air from the HP bleed source 88 to the HP header 66. The check valve 90 is configured to obstruct (e.g., completely or substantially completely block) air flow in a direction from the HP header 66 to the HP bleed source 88. The HP bleed source 88 may be, for example, an intermediate stage (e.g., a third or fourth stage) of the high-pressure compressor 24B (see FIG. 1).

The HP header 66 is connected in fluid communication with one or more high-pressure bleed air loads (HP loads) 92 downstream of the HP electric buffer compressor 62B and the HP bleed source 88. The HP loads 92 of FIG. 2 include one or more bearing compartments 94 (e.g., for the bearing assemblies 56; see FIG. 1). For example, the bearing compartments 94 of FIG. 2 include bearing compartment B4. The present disclosure, however, is not limited to any particular number of the bearing compartments 94. The HP header 66 is configured to supply pressurized air to the bearing compartments 94 for air buffering and/or cooling. The HP header 66 of FIG. 2 is isolated from the LP header 64 of FIG. 2. This configuration of the LP header 64 and the HP header 66 facilitates optimal sizing the LP header 64 and the HP header 66 for the air pressure and air flow requirements of the LP bleed loads 82 and the HP bleed loads 92, respectively.

The HP header 66 of FIG. 2 further includes a heat exchanger 96. The heat exchanger 96 is configured to cool high-temperature air which may be received from the HP bleed source 88. The heat exchanger 96 of FIG. 2 includes an air inlet 98 and an air outlet 100. The air inlet 98 is connected in fluid communication with the check valve 76 and the check valve 90 to receive pressurized air from the HP electric buffer compressor 62B or the HP bleed source 88. The air outlet 100 is connected in fluid communication with the HP loads 92 to direct cooled, pressurized air to the HP loads 92. The heat exchanger 96 is connected in fluid communication with a cooling fluid source for cooling the pressurized air flowing through the heat exchanger 96 from the air inlet 98 to the air outlet 100. For example, as shown in FIG. 2, the cooling fluid source may be air from the bypass flow path 60 (see FIG. 1). The present disclosure, however, is not limited to the foregoing exemplary cooling fluid source.

The controller 68 includes a processor 102 connected in signal communication with memory 104. The processor 102 may include any type of computing device, computational circuit, processor(s), CPU, computer, or the like capable of executing a series of instructions that are stored in the memory 104. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the buffer air assembly 32 to accomplish the same algorithmically and/or by coordination of buffer air assembly 32 components. For example, the controller 68 may be connected in signal communication with each of the at least one electric buffer compressor 62 and/or one or more sensors 106 (e.g., pressure sensors) of the buffer air assembly 32. The present disclosure is not limited to the foregoing exemplary sensor 106 locations illustrated in FIG. 2. The memory 104 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 68. The controller 68 may include, or may be in communication with, an input device that enables a user to enter data and/or instructions, and may include, or be in communication with, an output device configured, for example to display information (e.g., a visual display or a printer), or to transfer data, etc. Communications between the controller 68 and other electrical and/or electronic components of the buffer air assembly 32 may be via a hardwire connection or via a wireless connection. A person of skill in the art will recognize that portions of the controller 68 may assume various forms (e.g., digital signal processor, analog device, etc.) capable of performing the functions described herein.

The controller 68 may form or otherwise be part of an electronic engine controller (EEC) for the engine 20. The EEC may control operating parameters of the engine 20 including, but not limited to, fuel flow, stator vane position (e.g., variable compressor inlet guide vane (IGV) position), compressor air bleed valve position, shaft (e.g., first shaft 42 and/or second shaft 48) torque and/or rotation speed, etc. so as to control an engine power or performance of the engine 20. The EEC may modulate fuel flow to the combustor 34 to obtain a desired output power of the engine 20. For example, the EEC may modulate the fuel flow using a closed-loop process in which an output power or other operating parameter of the engine 20 is measured and fuel flow is increased or decreased as a function of the measured output power or operational parameter. In some embodiments, the EEC may be part of a full authority digital engine control (FADEC) system for the engine 20.

In operation, the buffer air assembly 32 and its at least one electric buffer compressor 62 may be used to facilitate a suitable supply of buffer air during operating conditions of the engine 20 such as, but not limited to, a startup sequence for the engine 20 in which compressor bleed air (e.g., from the HP bleed source 74 and/or the LP bleed source 82) may initially be insufficient for providing suitable bearing compartment 88, 94 buffering. The buffer air assembly 32 may additionally or alternatively supply buffer air other operating conditions of the engine 20, as will be discussed in further detail. The present disclosure buffer air assembly 32 eliminates the buffer switching valve used in at least some conventional buffer air systems while also facilitating the supply of pressurized buffering air during engine operating conditions (e.g., startup, shutdown, and/or low power conditions) in which compressor bleed air may be insufficient.

The startup sequence for the engine 20, including operation of the buffer air assembly 32 and its at least one electric buffer compressor 62, may be controlled by the controller 68 in accordance with a startup sequence schedule or other control regime. The controller 68 may control (e.g., energize) the at least one electric buffer compressor 62 to direct pressurized air to the LP header 64 and/or the HP header 66. For example, the controller 68 may control (e.g., energize) the LP electric buffer compressor 62A to direct pressurized air to the LP header 64. Simultaneously or independently, the controller 68 may control (e.g., energize) the HP electric buffer compressor 62B to direct pressurized air to the HP header 66. The controller 68 may additionally control an air-powered starter motor or other engine starting assembly to drive initial rotation, for example, of the first rotational assembly 36 (e.g., the high-pressure spool; see FIG. 1). The present disclosure, however, is not limited to the foregoing exemplary engine starting assembly configuration.

As the startup sequence progresses, air pressure from the LP bleed source 78 may increase such that the LP bleed source 78 may supply sufficient pressurized air for the LP loads 86. Similarly, air pressure from the HP bleed source 88 may increase such that the HP bleed source 88 may supply sufficient pressurized air for the HP loads 92. The controller 68 may then deenergize the at least one electric buffer compressor 62 (e.g., the LP electric buffer compressor 62A and/or the HP electric buffer compressor 62B) once air pressure from the LP bleed source 78 and/or the HP bleed source 88 is suitable for supplying the respective LP loads 86 and HP loads 92. The controller 68 may deenergize the at least one electric buffer compressor 62 based on a predetermined period of time having elapsed since initiation of the startup sequence. Alternatively, the controller 68 may deenergize the at least one electric buffer compressor 62 based on a measured air pressure from the LP bleed source 78 and/or the HP bleed source 88 (e.g., using the sensors 106). For example, the controller 68 may deenergize the at least one electric buffer compressor 62 in response to identification of the measured air pressure from the LP bleed source 78 and/or the HP bleed source 88 greater than or equal to a respective pressure threshold (e.g., a predetermined pressure threshold value indicative of sufficient pressurized air for buffering).

In the event of a failure of the at least one electric buffer compressor 62 (e.g., the LP electric buffer compressor 62A and/or the HP electric buffer compressor 62B), the configuration of the buffer air assembly 32 may facilitate the supply of pressurized air from the LP bleed source 78 and/or the HP bleed source 88 to direct pressurized air to the respective LP header 64 and/or the HP header 66 to facilitate at least some buffering and/or cooling for the LP loads 86 and the HP loads 92 during the startup sequence. While the operation of the buffer air assembly 32 is described above for an engine 20 startup sequence, it should be understood that the present disclosure electric buffer compressor 62 may additionally or alternatively be operated with the buffer air assembly 32 for an engine 20 shutdown sequence or another operating condition of the engine 20 in which compressor bleed air (e.g., from the HP bleed source 78 and/or the LP bleed source 88) may not be available or may not provide suitable pressurized air flow for buffering and/or cooling the LP loads 82 and/or the HP loads 92.

The buffer air assembly 32 and its at least one electric buffer compressor 62 may additionally be used to facilitate a suitable supply of buffer air during ground and/or flight operating conditions in which pressurized air from the at least one electric buffer compressor 62 may be preferable to the use of pressurized air from one or both of the LP bleed source 78 and/or the HP bleed source 88 such as, but not limited to, relatively lower power ground and flight operating conditions. For example, the LP electric buffer compressor 62A may supply pressurized air for the LP bleed loads 82 from the initiation of the engine 20 startup sequence through and including a low-power flight condition such as, but not limited to flight idle or minimum cruise. For further example, the HP electric buffer compressor 62B may supply pressurized air for the HP bleed loads 92 from the initiation of the engine 20 startup sequence through and including a low-power ground condition such as, but not limited to, idle. The present disclosure, however, is not limited to the foregoing exemplary engine 20 operating conditions for operation of the at least one electric buffer compressor 62. The controller 68 may control (e.g., energize) the at least one electric buffer compressor 62 to direct pressurized air to the LP header 64 and/or the HP header 66 based on a measured air pressure from the LP bleed source 78 and/or the HP bleed source 88 (e.g., using the sensors 106). For example, the controller 68 may energize the at least one electric buffer compressor 62 in response to identification of the measured air pressure from the LP bleed source 78 and/or the HP bleed source 88 less than or equal to a respective pressure threshold (e.g., a predetermined pressure threshold value which may be indicative of insufficient or otherwise non-optimal pressurized air for buffering), for example, in response to a decrease in engine 20 power.

The LP electric buffer compressor 62A of FIG. 2 is connected in fluid communication with the LP header 64 independent of the LP bleed source 78. Similarly, the HP electric buffer compressor 62B of FIG. 2 is connected in fluid communication with the HP header 66 independent of the HP bleed source 88. In some embodiments, the at least one electric buffer compressor 62 (e.g., the LP electric buffer compressor 62A and/or the HP electric buffer compressor 62B) may be connected in fluid communication with the LP header 64 or HP header 66 with one of the LP bleed source 78 or the HP bleed source 88 in a series arrangement. For example, the air inlet 70 of the LP electric buffer compressor 62A may be connected in fluid communication with the LP bleed source 78 and the air outlet 72 of the LP electric buffer compressor 62A may be connected in fluid communication with the LP header 64. For further example, the air inlet 70 of the HP electric buffer compressor 62B may be connected in fluid communication with the HP bleed source 88 and the air outlet 72 of the HP electric buffer compressor 62B may be connected in fluid communication with the HP header 66. This series arrangement may facilitate elimination one or more of the check valves 74, 76, 80, 90 and may further facilitate the use of a smaller electric buffer compressor 62, but may also expose the at least one electric buffer compressor 62 to high-temperature pressurized air from the LP bleed source 78 and/or the HP bleed source 88.

Still referring to FIG. 2, in some embodiments, the buffer air assembly 32 may additionally include a blow-off valve 108 connected in fluid communication with the at least one electric buffer compressor 62 downstream of the air outlet 72. For example, the blow-off valve 108 may be connected in fluid communication with one or both of the LP electric buffer compressor 62A and the HP electric buffer compressor 62B at (e.g., on, adjacent, or proximate) and/or downstream of the respective air outlet 72 and upstream of the respective check valve 74, 76, as shown in FIG. 2. The blow-off valve 108 may be configured as a pressure relief valve to prevent a surge of the at least one electric buffer compressor 62 during certain operating conditions of the buffer air assembly 32. For example, an increase of the air pressure from the HP bleed source 88 above an outlet air pressure of the HP electric buffer compressor 62B may cause the check valve 76 to shut, potentially causing a sudden increase in the outlet air pressure of the HP electric buffer compressor 62B (e.g., a surge). The blow-off valve 108 may relieve the air pressure at the air outlet 72 until the at least one electric buffer compressor 62 can be deenergized (e.g., by the controller 68). Additionally or alternatively, the controller 68 may monitor the air pressure from the LP bleed source 78 and/or the HP bleed source 88 and deenergize the respective at least one electric buffer compressor 62 before the air pressure from the LP bleed source 78 and/or the HP bleed source 74 increases above the outlet air pressure of the respective at least one electric buffer compressor 62.

Figure 3:
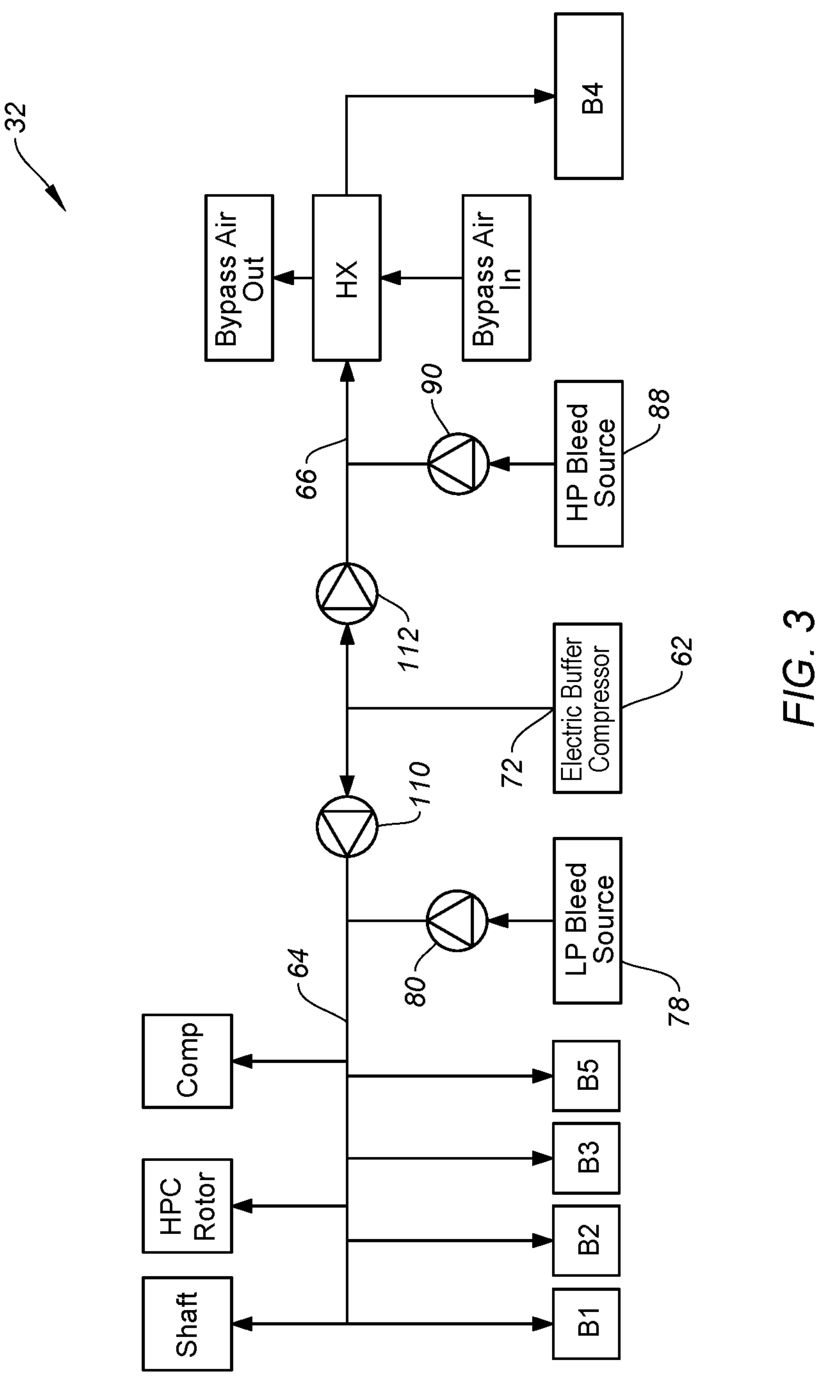
FIG. 3 schematically illustrates another buffer air assembly for an engine, in accordance with one or more embodiments of the present disclosure.

FIG. 3 schematically illustrates another embodiment of the buffer air assembly 32 including a single electric buffer compressor 62 configured to direct pressurized air to both of the LP header 64 and the HP header 66. The air outlet 72 of the electric buffer compressor 62 of FIG. 3 is connected in fluid communication with the LP header 64 by a check valve 110. The air outlet 72 of the electric buffer compressor 62 of FIG. 3 is additionally connected in fluid communication with the HP header 66 by a check valve 112. The check valve 110 is configured to direct pressurized air from the electric buffer compressor 62 (e.g., the air outlet 72) to the LP header 64. The check valve 110 is configured to obstruct (e.g., completely or substantially completely block) air flow in a direction from the LP header 64 to the electric buffer compressor 62 or the HP header 66. The check valve 112 is configured to direct pressurized air from the electric buffer compressor 62 (e.g., the air outlet 72) to the HP header 66. The check valve 112 is configured to obstruct (e.g., completely or substantially completely block) air flow in a direction from the HP header 66 to the electric buffer compressor 62 or the LP header 64. As with the buffer air assembly 32 of FIG. 2, the LP bleed source 78 is connected in fluid communication with the LP header 64 by the check valve 80 and the HP bleed source 88 is connected in fluid communication with the HP header 66 by the check valve 90.

Figure 4:
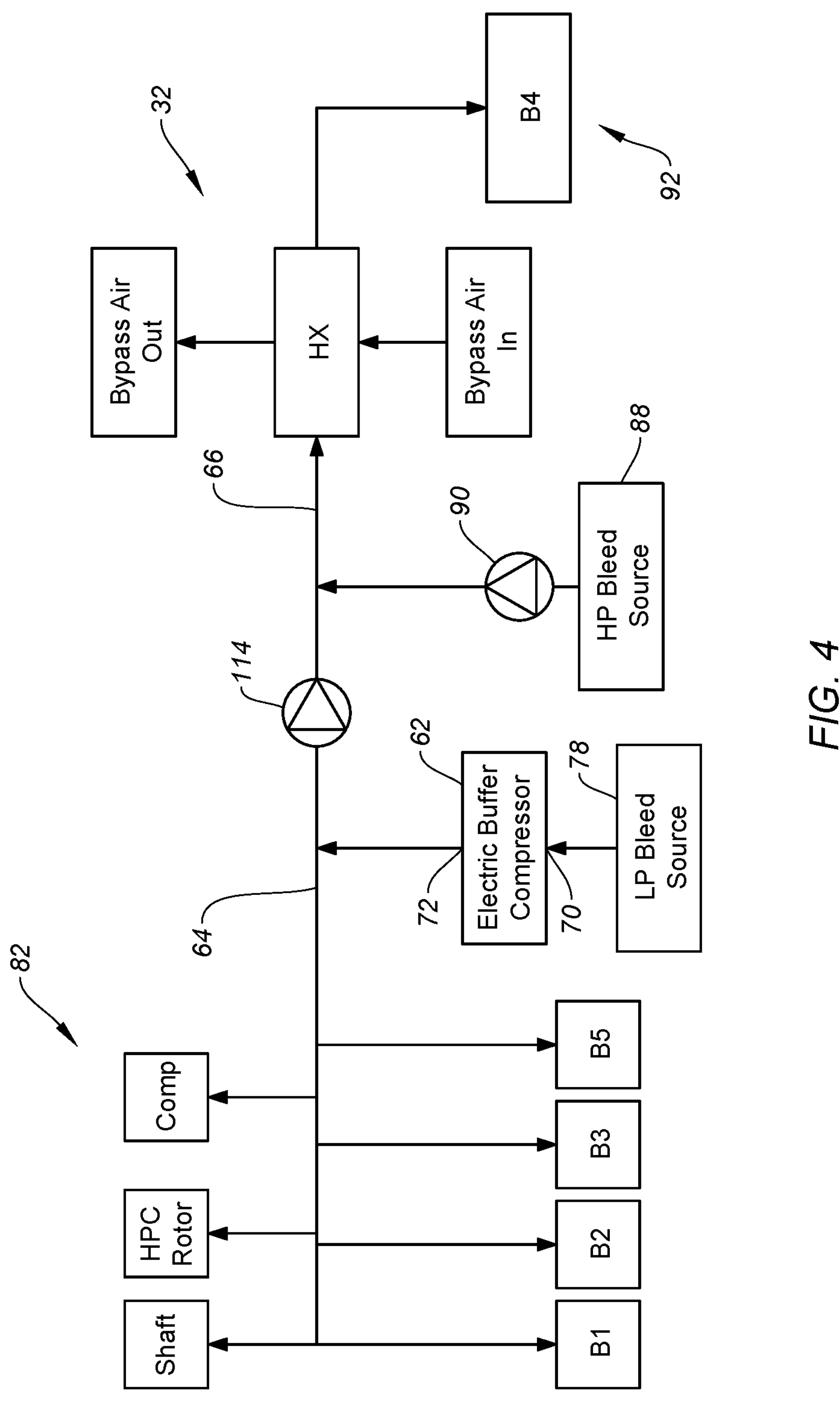
FIG. 4 schematically illustrates another buffer air assembly for an engine, in accordance with one or more embodiments of the present disclosure.

FIG. 4 schematically illustrates another embodiment of the buffer air assembly 32 including a single electric buffer compressor 62 configured to direct pressurized air to both of the LP header 64 and the HP header 66. The air inlet 70 of the electric buffer compressor 62 of FIG. 4 is connected in fluid communication with and downstream of the LP bleed source 78. The air outlet 72 of the electric buffer compressor 62 of FIG. 4 connected in fluid communication with the LP header 64. The LP header 64 of FIG. 4 is connected in fluid communication with the HP header 66 by a check valve 114. The check valve 114 is configured to direct pressurized air from the LP header 64 to the HP header 66. The check valve 114 is configured to obstruct (e.g., completely or substantially completely block) air flow in a direction from the HP header 66 to the LP header 64. As with the buffer air assembly 32 of FIG. 2, the HP bleed source 88 is connected in fluid communication with the HP header 66 by the check valve 90. The buffer air assembly 32 configuration of FIG. 4 facilitates boosting pressurized air from the LP bleed source 78 with the electric buffer compressor 62 to provide suitable pressurized air flow for buffering and/or cooling the LP loads 82 and/or the HP loads 92. As air pressure from the HP bleed source 88 increases, for example, during or after a startup sequence for the engine 20 (see FIG. 1), the pressurized air from the HP bleed source 88 may cause the check valve 114 to close such that only the HP bleed source 88 supplies pressurized air for the HP header 66. In some embodiments, the buffer air assembly 32 of FIG. 4 may additionally include a second electric buffer compressor 62 connected in fluid communication with the HP header 66, for example, as shown in FIG. 2 for the HP electric buffer compressor 62B.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms “a,” “an,” and “the” refer to one or more than one, unless the context clearly dictates otherwise. For example, the term “comprising a specimen” includes single or plural specimens and is considered equivalent to the phrase “comprising at least one specimen.” The term “or” refers to a single element of stated alternative elements or a combination of two or more elements unless the context clearly indicates otherwise. As used herein, “comprises” means “includes.” Thus, “comprising A or B,” means “including A or B, or A and B,” without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A buffer air assembly for an aircraft engine, the buffer air assembly comprising:

a first pressurized air header;

at least one first bearing compartment connected in fluid communication with the first pressurized air header;

a first bleed air source connected in fluid communication with the first pressurized air header by a first bleed check valve, and the first bleed air source is configured to direct first pressurized bleed air to the first pressurized air header through the first bleed check valve;

at least one electric buffer compressor connected in fluid communication with the first pressurized air header by a first buffer compressor check valve;

at least one second bearing compartment connected in fluid communication with a second pressurized air header;

a second bleed air source, different than the first bleed air source, connected in fluid communication with the second pressurized air header, and the second bleed air source is configured to direct second pressurized bleed air to the second pressurized air header; and a controller connected in signal communication with the at least one electric buffer compressor, and the controller includes a processor in communication with a non-transitory memory storing instructions, which instructions when executed by the processor, cause the processor to:

energize the at least one electric buffer compressor to direct the pressurized buffering air to the first pressurized air header;

measure a pressure of the first pressurized bleed air or a pressure of the second pressurized bleed air;

identify the measured pressure is greater than or equal to a predetermined threshold pressure; and deenergize the at least one electric buffer compressor in response to the identification of the measured pressure greater than or equal to the predetermined threshold pressure;

wherein the second pressurized air header is connected in fluid communication with the first pressurized air header by the first buffer compressor check valve; and wherein the first buffer compressor check valve is configured to direct pressurized air from the second pressurized air header to the first pressurized air header.

2. The buffer air assembly of claim 1, wherein the at least one electric buffer compressor includes a single electric buffer compressor, the single electric buffer compressor includes an air outlet and an air inlet, the air outlet is connected in fluid communication with the first pressurized air header by the first buffer compressor check valve, and the second bleed air source is connected in fluid communication with the air inlet.

3. The buffer air assembly of claim 1, wherein the instructions, when executed by the processor, further cause the processor to:

measure a pressure of the first pressurized bleed air or a pressure of the second pressurized bleed air;

identify the measured pressure is less than or equal to a predetermined threshold pressure; and energize the electric buffer compressor to direct the pressurized buffering air to the first pressurized air header in response to identification of the measured pressure less than or equal to the predetermined threshold pressure.

4. The buffer air assembly of claim 1, wherein the second bleed air source is connected in fluid communication with the second pressurized air header by a second bleed check valve; and the second bleed air source is configured to direct second pressurized bleed air to the second pressurized air header through the second bleed check valve.

5. An engine for an aircraft, the engine comprising:

a low-pressure compressor;

a high-pressure compressor; and a buffer air assembly including:

a low-pressure header connected to at least one low-pressure bearing compartment and the low-pressure compressor;

a high-pressure header connected to at least one high-pressure bearing compartment and the high-pressure compressor, the high-pressure header is configured to receive a high-pressure bleed air from the high-pressure compressor, and the high-pressure header is in fluid communication with the low-pressure header; and at least one electric buffer compressor configured to direct pressurized buffering air to the low-pressure header and the high-pressure header, the at least one electric buffer compressor including an air outlet and an air inlet, the air outlet connected in fluid communication with the low-pressure header, and the air inlet connected in fluid communication with an outlet of the low-pressure compressor;

a controller connected in signal communication with the at least one electric buffer compressor, and the controller includes a processor in communication with a non-transitory memory storing instructions, which instructions when executed by the processor, cause the processor to:

control an engine startup sequence for the engine, the engine startup sequence including energizing the at least one electric buffer compressor to direct the pressurized buffering air to the low-pressure header and the high-pressure header, the pressurized buffering air directed to the high-pressure header is from the low-pressure header.

6. The engine of claim 5, further comprising:

a first rotational assembly including the high-pressure compressor;

a second rotational assembly including the low-pressure compressor;

at least one high-pressure bearing assembly rotatably supporting the first rotational assembly, and the at least one high-pressure bearing assembly is connected to the high-pressure header; and at least one low-pressure bearing assembly rotatably supporting the second rotational assembly, and the at least one low-pressure bearing assembly is connected to the low-pressure header.

7. The buffer air assembly of claim 5, wherein the at least one electric buffer compressor includes a single electric buffer compressor, and the single electric buffer compressor is configured to direct the pressurized buffer air to both of the low-pressure header and the high-pressure header.

8. A buffer air assembly for an aircraft engine, the buffer air assembly comprising:

a first pressurized air header;

at least one first bearing compartment connected in fluid communication with the first pressurized air header;

a first bleed air source connected in fluid communication with the first pressurized air header, and the first bleed air source is configured to direct first pressurized bleed air to the first pressurized air header;

a second pressurized air header;

a second pressurized air header bleed air load connected in fluid communication with the second pressurized air header, the second pressurized air header bleed air load including at least one second bearing compartment, at least one bladed rotor and an engine shaft;

a second bleed air source, different than the first bleed air source, connected to and in fluid communication with the second pressurized air header, and the second bleed air source is configured to direct second pressurized bleed air to the first pressurized air header; and at least one electric buffer compressor configured to direct pressurized buffer air to the first pressurized air header and the second pressurized air header;

wherein the second pressurized air header is connected in fluid communication with the first pressurized air header by an air header check valve; and wherein the air header check valve is configured to direct pressurized air from the second pressurized air header to the first pressurized air header.

9. The buffer air assembly of claim 8, wherein the at least one electric buffer compressor includes a single electric buffer compressor, and the single electric buffer compressor is configured to direct the pressurized buffer air to both of the first pressurized air header and the second pressurized air header.

10. The buffer air assembly of claim 8, wherein the first bleed air source is connected in fluid communication with the first pressurized air header by a first bleed check valve.

* * * * *